Figure 7:
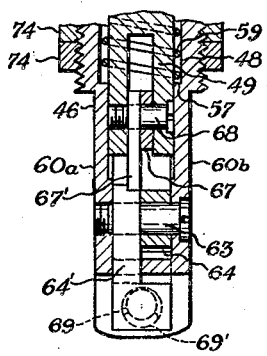

Aug. 23, 1932.                    M. CASTRO                    1,873,822
                    HOOK FOR AIRCRAFT CARGO HANDLING APPARATUS
                        Filed Aug. 1, 1929        3 Sheets-Sheet 1
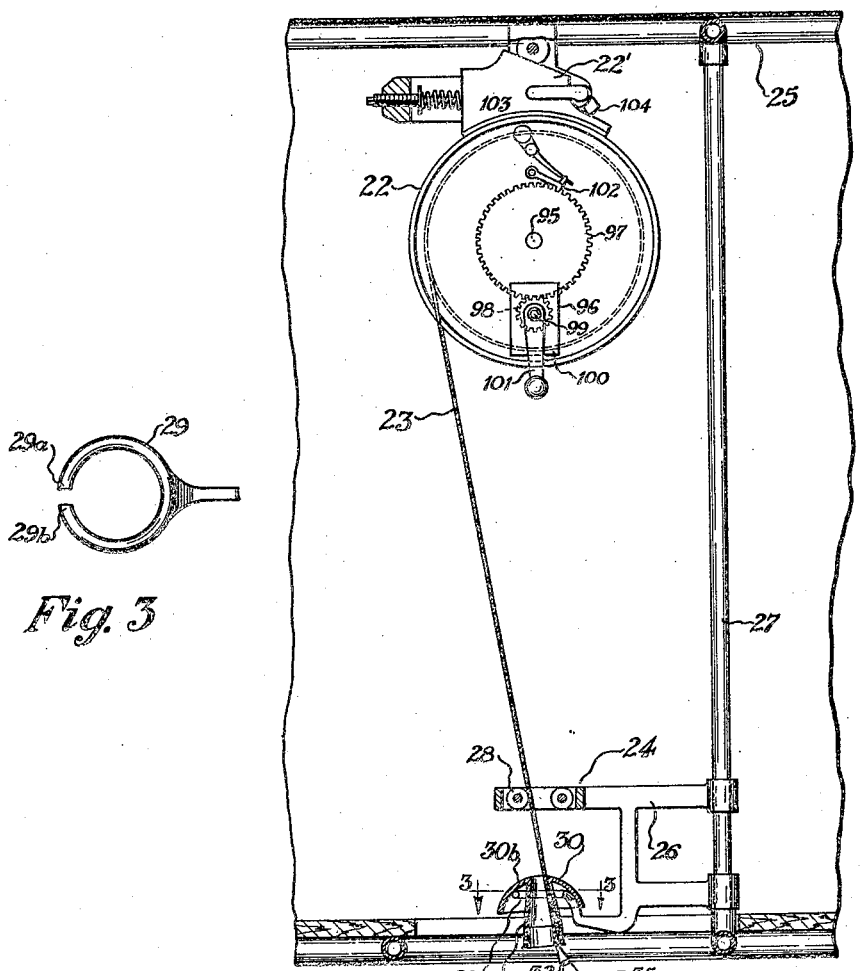
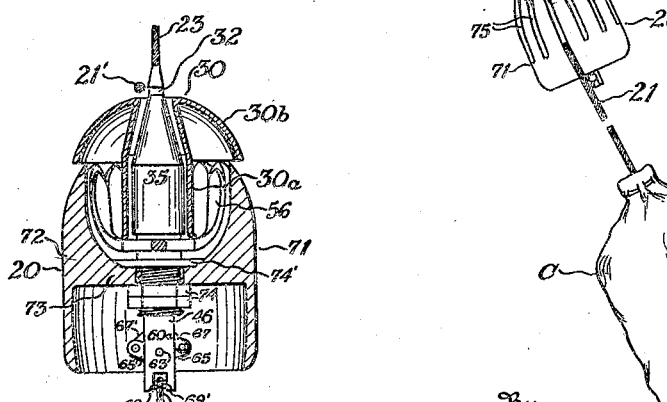
Inventor
M. Castro Aug. 23, 1932.  M. CASTRO  1,873,822
HOOK FOR AIRCRAFT CARGO HANDLING APPARATUS
Filed Aug. 1, 1929  3 Sheets-Sheet 2

Inventor
M. Castro
By Harry Frease
Attorney

Aug. 23, 1932. M. CASTRO 1,873,822
HOOK FOR AIRCRAFT CARGO HANDLING APPARATUS
Filed Aug. 1, 1929 3 Sheets-Sheet 3

Inventor
M. Castro
By Harry Frease
Attorney

Patented Aug. 23, 1932

1,873,822

UNITED STATES PATENT OFFICE

MANUEL CASTRO, OF CANTON, OHIO

HOOK FOR AIRCRAFT CARGO HANDLING APPARATUS

Application filed August 1, 1929. Serial No. 382,614.

My invention relates to apparatus for picking up and discharging a cargo from aircraft in flight, and the present invention is a continuation in part of and includes improvements of the apparatus set forth in my prior application for patent for Hooks for aircraft cargo handling apparatus, filed November 3, 1928, Serial No. 317,059 which is now Patent No. 1,729,029, dated Sept. 24, 1929.

Such apparatus necessarily includes elements operatively mounted on the ground, or on a ground structure, or on a ship, hereinafter termed the ground elements, for positioning the cargo to be picked up and for receiving the cargo to be discharged, and also includes elements operatively mounted on the aircraft, hereinafter termed the aircraft elements, for cooperating with the ground elements in picking up and discharging cargo.

A fundamental requirement for the successful operation of such apparatus, is to impart to the cargo to be picked up from rest, the required acceleration so that it will attain the velocity or flying speed of the aircraft without reducing the flying speed of the aircraft to any considerable extent.

For example it is estimated that for an aircraft of 2,000 pounds gross load (total weight lifted), and with sufficient excess power to climb 300 ft./min., there is available sufficient excess thrust to provide a force of approximately 97.5 lbs. at 70 M. P. H. flying speed, for use in imparting to the cargo being picked up from rest the necessary acceleration so that it will attain the desired velocity.

Under these circumstances the distance required to be covered by the cargo from the instant it is connected with the pick up means until it attains the speed of the aircraft is as follows:

| | Feet |
|---|---|
| For 50 lbs. cargo, distance | 84.3 |
| For 40 lbs. cargo, distance | 67.5 |
| For 30 lbs. cargo, distance | 50.6 |
| For 20 lbs. cargo, distance | 33.7 |
| For 10 lbs. cargo, distance | 16.9 |

In other words, it is necessary for the successful operation of such apparatus that the pick up means be secured to a cable which is permitted an extension of 84.3, 67.5, 50.6, 33.7, or 16.9 feet according to the load to be picked up, as aforesaid.

I disclose means for accomplishing the foregoing in my prior application for patent for Cargo handling apparatus for aircraft and the like, filed October 2, 1928, Serial No. 309,881, and in the divisional application thereof, entitled Reels for aircraft cargo handling apparatus, filed November 3, 1928, Serial No. 317,060, which is now Patent No. 1,809,266 dated June 9, 1931.

The objects of the present invention include the provision of improved hook or combined pick up and discharge means, more particularly for the improved cargo handling apparatus for aircraft and the like of my aforesaid prior application, in which the aircraft elements include the pick up and discharge means, a cable upon which the pick up means are secured, and yielding means for permitting the necessary extension of the cable for imparting the aforesaid acceleration to the cargo being picked up from rest.

Further objects of the invention include the provision of guard means for the improved hook or combined pick up and discharge means.

Further objects of the invention include the provision of improvements in the detail construction and arrangement of the combined pick up and discharge means.

Figure 6:
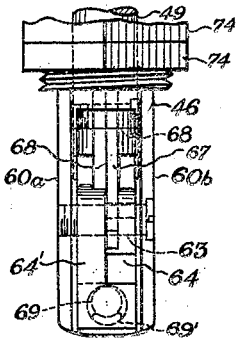
Figure 4:
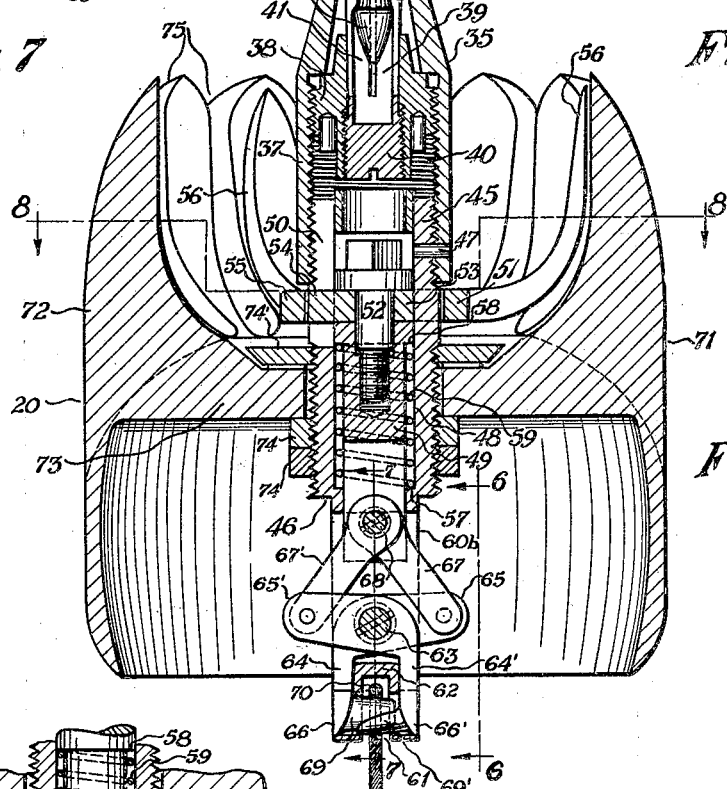
Figure 5:
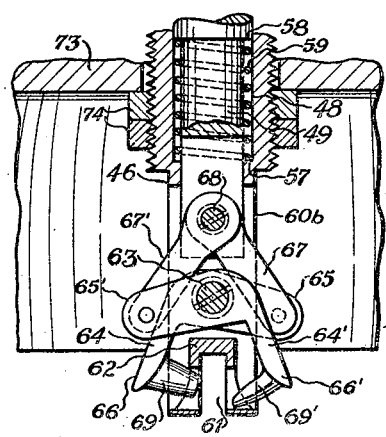
Figure 8:
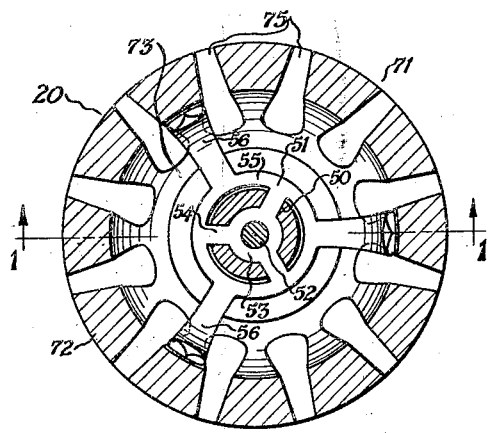
Figure 9:
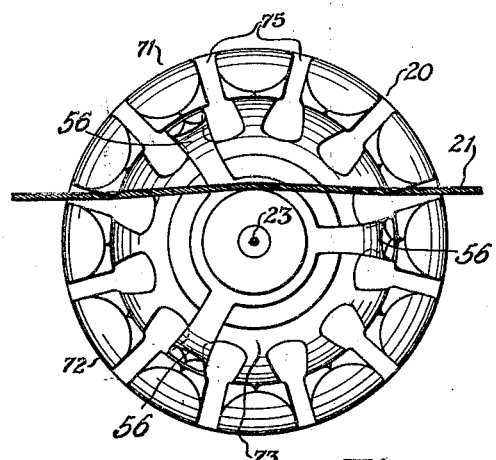
Figure 10:
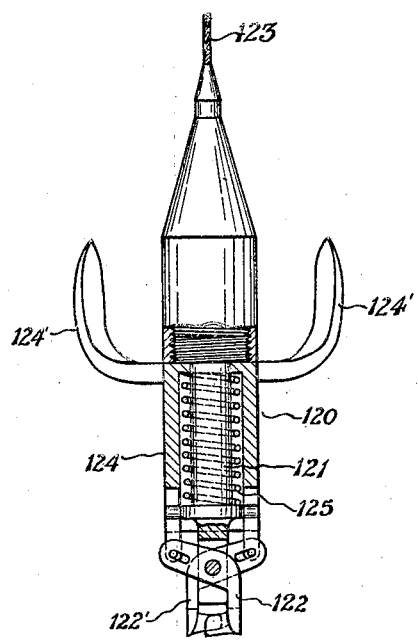
Figure 11:
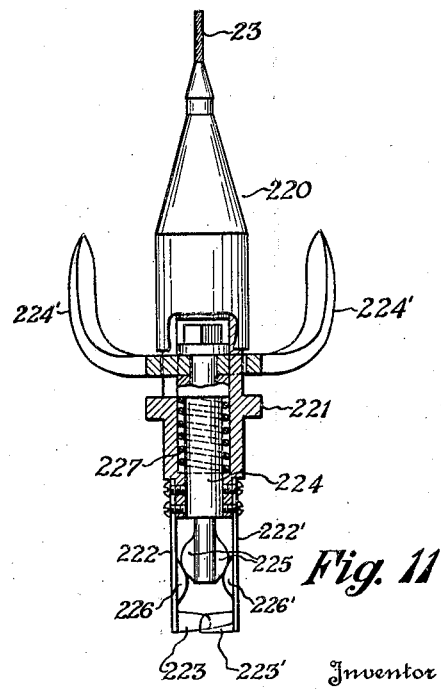

These and ancillary objects are attained in the improved hook for aircraft cargo handling apparatus and the like comprising the present invention, a preferred embodiment of which is hereinafter set forth in detail, and is illustrated in the accompanying drawings forming part hereof, in which Figure 1 is a fragmentary elevation view, with portions in section, illustrating one embodiment of the improved combined pick up hook and discharge tongs in use with other improved aircraft elements of aircraft cargo handling apparatus;

Fig. 2, a longitudinal sectional view of the combined pick up hook and discharge tongs with its auxiliary shield actuator in place for permitting operation only of the discharge tongs;

Fig. 3, a fragmentary view of the improved shield actuator support in the aircraft, looking in the direction of the arrows 3—3, Fig. 1;

Fig. 4, an enlarged longitudinal axial sectional view, of the aforesaid embodiment of the improved combined pick up hook and discharge tongs, the tongs being in closed position for carrying cargo to be discharged;

Fig. 5, a fragmentary view similar to Fig. 4, the tongs having been actuated to open for discharging the cargo;

Fig. 6, a fragmentary elevation view thereof, as in the direction of arrows 6—6, Fig. 4;

Fig. 7, a fragmentary vertical sectional view thereof, as on line 7—7, Fig. 4;

Fig. 8, a plan sectional view thereof, as on line 8—8, Fig. 4 showing the hook arms in elevation;

Fig. 9, a plan view thereof, as in the direction of the arrows 9—9, Fig. 4, illustrating the hook engaging a cargo connecting cable for picking up the cargo secured at the ends of the cable, and for actuating the discharge tongs to open;

Fig. 10, a view similar to Fig. 4, illustrating another embodiment of the combined pick up hook and discharge tongs; and Fig. 11, another similar view illustrating another embodiment of the combined pick up hook and discharge tongs.

Similar numerals refer to similar parts throughout the drawings.

The embodiment of the improved combined pick up hook and discharge tongs indicated generally at 20 in Figs. 1 to 9, inclusive, is illustrated in Fig. 1 in combination with other improved elements comprising aircraft elements of aircraft cargo handling apparatus.

Aircraft cargo handling apparatus usually includes ground elements and aircraft elements. Of the ground elements for the purposes of setting forth the present invention, it is only necessary to illustrate the cargo connecting cable 21, in Figs. 1 and 9.

The cargo connecting cable 21 has cargo carrying bags C or the like secured at its outer ends, and may be preferably used in connection with the other ground elements set forth in my aforesaid prior application for Letters Patent, Serial No. 309,881.

The present improved aircraft elements of the cargo handling apparatus, in addition to the improved combined pick up hook and discharge tongs 20, includes a reel 22, preferably embodying the improvements set forth in my aforesaid prior application for patent, and a cable 23, preferably releasably connected at its opposite ends with the hook and tongs 20 and the reel 22, respectively.

The reel end of the cable may be releasably secured to the reel 22, as is set forth in detail in my aforesaid prior applications for patent, whereby if the cable 23 becomes entirely unwound from the reel by reason of the fact that the pick up hook has become engaged with an immovable object, the reel end of the cable will automatically become disconnected from the reel, thus releasing the aircraft and preventing loss of flying speed.

The cable 23 is of a substantial length sufficient for being payed out from the reel against a suitable unwinding reaction as for example the reaction of a friction brake 22′, in order that the aforesaid acceleration may be imparted to the cargo being picked up without causing a reduction in the aircraft flying speed.

The cable 23 passes through an improved combined cable guide and shield actuator support, indicated generally at 24, which is operatively mounted in the aircraft fuselage 25.

The cable guide and actuator support 24 includes a bracket 26 mounted beneath the reel 22 for sliding towards and away from the reel on the shaft 27 extending between upper and lower members of the fuselage.

Adjacent the reel 22, cable guide rollers 28 are mounted on the bracket 26, and the cable 23 passes between the guide rollers.

Below the rollers 28, a split ring actuator support 29 is also carried by the bracket 26, and the cable 23 may be introduced into or removed from the split ring support 29 by being passed between the opposite ends 29a and 29b of the ring.

A tong actuator 30 is removably mounted in the support 29, and preferably includes an inner tube 30a from the upper end of which extends an inverted mushroom bowl 30b.

The cable 23 extends through the tube 30a, and the outer end of the cable is removably connected with the combined pick up hook and discharge tongs 20.

When the actuator 30 is mounted as illustrated in Fig. 1, by insertion of the tube 30a through the split ring support 29, the combined hook and tongs 20 is adapted for operation to pick up and discharge cargo simultaneously as will hereinafter be set forth in detail.

When it is desired only to discharge a cargo, the guard actuator 30 is removed from the support 29 and assumes the position illustrated in Fig. 2, in which position the outer curved surface of the bowl 30b will strike and slide over a cable 21′ arranged for the purpose with sufficient force to operate the tongs to discharge a cargo.

The provision of the support 29 for removably mounting the actuator 30 within the fuselage, obviates the necessity of engaging and disengaging the outer end of the cable 23 from the cargo pick up and discharge means, that is, the combined hook and tongs 20, for applying or removing the actuator to or from the hook and tongs 20.

The mounting of the bracket 26 for sliding on the shaft 27 permits the roller guides 28 to be normally located in the preferred position adjacent the bottom of the fuselage when the cable 23 is being payed out by the reel 22, and also permits the hook and tongs 20 to be drawn up within the fuselage for removing cargo bags C which have been picked up and/or for removing the actuator 30 from its support 29, and/or for connecting a cargo to be discharged to the tongs.

The outer end of the cable 23 is removably connected with the cargo pick up and discharge means 20 preferably by passing through a longitudinal bore 31 in a shank 32, and the extremity of the cable being knotted to form an enlarged head 33 which fits in a side opening socket 34 in the shank at the inner end of and communicating with the bore 31.

The shank 32 extends outwardly and coaxially with the longitudinal axis of the cargo pick up and discharge means 20, which includes a tubular head 35 having an outer end bore 36 of reduced diameter into which the shank 32 extends with a sliding fit.

The outer end of the shank 32 is preferably in the form of a cone the base of which is slightly enlarged in diameter as compared with the diameter of the shank proper. The outer end of the tubular head 35 is also conical, and the conical outer surfaces of the shank head and tubular head flare outwardly from the cable 23, so that when the reel cable 23 strikes a cargo connecting cable 21, the shank 32 and tubular head 35 will be dragged easily over the cargo connecting cable.

The other end 37 of the tubular head 35 is preferably cylindric, and is provided with internal threads in which an externally threaded jaw mounting plug 38 is screwed for adjustable positioning at a desired longitudinal location.

The jaw mounting plug 38 has a longitudinally extending central bore 39 formed therein, and one end of the bore is internally threaded and screw mounts the externally threaded end 40 of a set of tubular spring jaws 41, which extend through and out of the plug bore towards the shank.

The heads 42 of the jaws are located outside of the mounting plug, and the spring of the jaws normally tends to displace the jaw heads away from each other.

Accordingly the gripping power of the jaw heads depends on the relative axial position of the jaws and the plug, and may be varied by screwing the threaded end 40 of the jaws in opposite directions in the plug.

The end 43 of the shank 32 within the tubular head 35 is conically tapered from an apex at its extremity towards the central portion of the shank and at the base of the tapered end, the shank has formed therein a neck groove 44 into which the jaw heads 42 extend for gripping the shank end with a variable force.

Accordingly, the jaws 41 may be adjusted as aforesaid for example, so that if a force of more than 250 pounds is applied upon the pick up and discharge means 20 opposite in direction to the pull of the cable 23, the jaw heads 42 will spring out of the neck groove 44, and the cable shank 32 will be automatically disconnected from the pick up and discharge means, even though the cable has not been entirely unwound from the reel.

The automatic releasing of the reel end of the cable from the reel, and of the outer end of the cable from the pick up and discharge means is essential in order to insure that the aircraft will maintain flying speed regardless of the magnitude of the force applied to the pick up and discharge means.

In the internally threaded end 37 of the head 35, one externally threaded end 45 of a hook and jaw mounting member 46 is screwed and preferably locked as by means of a pin 47.

The end 45 of the member 46 has a cylindric bore 48 formed therein, and a hook mounting and tong actuating piston 49 is mounted for longitudinal sliding in the bore.

The end 45 of the member 46 also has a plurality of longitudinally extending notches 50 formed therein and communicating with the bore 48.

A hook arm mounting web 51 is preferably removably secured upon the end of the piston 49 within the bore, as by means of a cap screw 52.

The web 51 includes a central hub 53 from which spokes 54 extend outwardly through the notches 50 and the spokes connect at their outer ends with a rim 55.

A plurality of curved hook arms 56 extend outwardly from the rim 55 towards the cable 23.

An inwardly extending shoulder 57 is formed in the member 46 at the outer end of the bore 48. An outwardly extending shoulder 58 is formed on the opposite end of the piston 49. A compression spring 59 is interposed between the shoulders 57 and 58 and normally urges the piston and hook arms towards the head 35.

The piston 49 extends outwardly beyond the shoulder 57, and the member 46 preferably includes at its outer end, laterally spaced longitudinally extending side bars 60a and 60b, each preferably having an end notch 61 formed therein, and the side bars being preferably connected at the base of their notches by a bridge member 62.

A laterally extending pivot pin 63 is mounted at its opposite ends in the side bars 60a and 60b between the bridge member 62 and the shoulder 57.

Discharge tongs 64 and 64' are pivotally mounted on the pivot pin, and the tongs are preferably in the form of bell cranks including, respectively, actuating arms 65 and 65' extending outwardly from opposite sides of the pivot pin between the bars 60a and 60b, and gripping arms 66 and 66' extending downwardly from the pivot pin between the side bars 60a and 60b.

The outer ends of the actuating arms 65 and 65' are pivotally connected with the outer ends of links 67 and 67', respectively; and the inner ends of the links are pivotally connected with the outer end of the piston by a common pin 68.

From the outer ends of the gripping arms 66 and 66', hook tongues 69 and 69' extend toward each other for overlapping when in the closed position illustrated in Fig. 4, and engaging an eye 70 at the end of a cable secured to the cargo bag to be discharged.

Accordingly when the piston is moved towards the tongs, either by direct engagement of one or more of the hook arms with a cargo connecting cable 21, or by engagement of the actuator 30, when in use with an actuating cable 21'; the tongs will be actuated to separate the hook tongues 69 and 69', thereby disengaging the same from the eye 70.

A guard member 71 is preferably provided for the pick up and discharge means 20, and may include a tube 72 having a central transverse web 73 through which the member 46 extends. The outer end of the cylindric portion of the member 46 is externally threaded and nuts 74 and 74' are screwed thereon and clamp against opposite faces of the web.

The end of the tube 72 about the hook arms 56 is provided with notches 75 for receiving the cargo connecting cable 21. The notches 75 are preferably greater in width at their inner ends than at their outer ends transversely for facilitating the reception of the cable 21, as is best illustrated in Figs. 8 and 9.

The guard member 71 provides protection for the various parts of the discharge means against damage thereto from colliding with any part of the ground structure provided for positioning the cargo to be picked up and for receiving the cargo to be discharged, or from bumping against any part of the fuselage of the aircraft.

The reel shaft 95 is journaled in a suitable reel mounting bracket 96, and the ends of the shaft extend outwardly therefrom, and a gear wheel 97 is secured at one end of the shaft 95 and arranged to be selectively engaged by a drive pinion 98 secured on a sliding stub shaft 99, which is slidably and rotatably mounted in a suitable U extension 100 of the reel mounting bracket 96, so that the driving pinion 98 may be engaged and disengaged with the gear wheel 97.

The outer end of the stub shaft 99 is provided with a removable drive crank 101.

A spring pressed pawl 102 is pivotally mounted on the reel bracket 96 for selective engagement with the gear wheel 97 for permitting either ratching of the reel shaft when the crank 101 is rotated to reel-in the cable 23, or free rotation of the reel.

For applying the necessary unwinding reaction to provide for the paying out of the cable 23 after hooking a cargo the friction brake 22' may include a spring pressed brake shoe 103 suitably mounted in the frame 96, and a lever pawl 104 is provided for selectively maintaining the brake shoe in or out of operative position.

The cargo handling apparatus for aircraft thus described, is used for picking up and discharging cargo by arranging the ground elements so that the cable 21 is horizontal, and by paying out the cable 23 from the aircraft reel 22, a suitable distance depending on the weight of the cargo to be discharged which is carried by the combined pick up hook and discharge tongs 20, the tongues 69 and 69', as aforesaid, passing through the eye 70 connected with the cargo to be discharged.

In the day-time the pilot on the oncoming aircraft may guide the aircraft by flying between flag signals at the proper height; in night-time operation, the pilot steers his course by the intersection of the beams of search lights.

The cable 23 will first strike the cable 21 connecting the cargos C to be picked up, and the reel cable 23 will be dragged over the transversely extending cargo connecting cable 21, until one of the hook arms 56 hooks against the transversely extending cargo connecting cable 21; when the first action of the moving combined pick up and discharge means 20 striking the stationary cargo connecting cable 21, will be to operate the tong arms 64 and 64' to discharge the cargo C.

Simultaneously, the hook arm 56 will have caught the transversely extending cable 21 and due to the yielding resistance of the unwinding reaction provided by the spring pressed break shoe 103, the cable 23 will first be payed out until a velocity has been imparted to the picked up cargo equal to the velocity of the aircraft, the distance that the cable is required to be payed out, depending as aforesaid on the weight of the cargo to be picked up.

When the picked-up cargo has attained the velocity of the moving aircraft, the pilot or other operator in the aircraft may turn the crank 101 to reel in the cable and bring the picked-up cargo within the aircraft, after which the cable may be reeled out for discharging and picking up other cargoes.

The modified embodiment of the improved pick-up and discharge means 120 illustrated in Fig. 10, includes an inner piston 121 at the outer end of which tongs 122 and 122' are pivotally mounted and actuated by an outer sleeve 124 on which hook arms 124' are mounted. The outer end of the sleeve 124 is slot and pivot connected with the tongs 122 and 122'. The piston 121 is connected with a cable 123 by means similar to that set forth for the embodiment 20. A compression spring 125 is interposed between shoulders formed on the piston and sleeve for normally maintaining the tongs in the closed position.

The other modified embodiment 220 illustrated in Fig. 11, includes a mounting member 221 at the outer end of which longitudinally extending spring arms 222 and 222' are secured and terminate in hook tongues 223 and 223', respectively. A piston 224 is slidably mounted within the member 221 and carries hook arms 224'. At the outer end of the piston 224, a cam 225 is secured for coacting against cams 226 and 226' carried on the spring arms 222 and 222', whereby the arms and tongues are separated by reciprocation of the piston. A compression spring 227 is interposed between shoulders formed on the piston and mounting member for normally maintaining the tongues in closed position.

I claim:

1. Aircraft cargo handling apparatus including combined cargo pick up and discharge means adapted to be carried at the end of a cable, and guard means for the pick up and discharge means.

2. Aircraft cargo handling apparatus including a member for connection with a cable, tongs operatively mounted on the member, a hook slidably mounted on the member, means operatively connecting the tongs and the hook, and guard means for the tongs and hook.

3. Aircraft cargo handling apparatus including cargo discharge means adapted to be carried at the end of a cable, and slotted guard means for the discharge means.

4. Aircraft cargo handling apparatus including combined cargo pick up and discharge means adapted to be carried at the end of a cable, and slotted guard means for the pick up and discharge means.

5. Aircraft cargo handling apparatus including a member for connection with a cable, tongs operatively mounted on the member, a hook slidably mounted on the member, means operatively connecting the tongs and the hook, and slotted guard means for the tongs and hook.

6. Aircraft cargo handling apparatus including cargo discharge means adapted to be carried at the end of a cable, and combined guard and actuator means for the discharge means.

7. Aircraft cargo handling apparatus including a cable, cargo discharge means carried at the end of the cable, and actuator means for the discharge means, the actuator means being slidably mounted on the cable.

8. Aircraft cargo handling apparatus including a cable, combined cargo pick up and discharge means carried at the end of the cable, and actuator means for the pick up and discharge means, the actuator means being slidably mounted on the cable.

In testimony that I claim the above, I have hereunto subscribed my name.

MANUEL CASTRO.